United States Patent [19]
Kim et al.

[11] Patent Number: 6,167,265
[45] Date of Patent: Dec. 26, 2000

[54] METHOD FOR MANAGING SYSTEM FAULT FOR CDMA HOME LOCATION REGISTER

[75] Inventors: Jong-Hoon Kim; Yeong-Gil Hwang, both of Seoul, Rep. of Korea

[73] Assignee: Samsung Electronics Co., Ltd., Rep. of Korea

[21] Appl. No.: 09/042,481

[22] Filed: Mar. 16, 1998

[30] Foreign Application Priority Data

Apr. 3, 1997 [KR] Rep. of Korea ...................... 97-12285

[51] Int. Cl.⁷ .................................................. H04Q 7/20
[52] U.S. Cl. ........................ 455/433; 455/424; 455/67.7; 455/67.1; 455/560; 370/242; 395/183.01
[58] Field of Search .................................. 455/423, 424, 455/433, 67.1, 9, 8, 115, 67.7, 226.1, 560; 370/242, 243, 244, 245, 246; 395/183.01, 183.13, 183.18, 184.01

[56] References Cited

U.S. PATENT DOCUMENTS

| | | | |
|---|---|---|---|
| 5,561,854 | 10/1996 | Antic et al. | 455/67.1 |
| 5,594,942 | 1/1997 | Antic et al. | 455/67.1 |
| 5,872,911 | 2/1999 | Berg | 395/183.19 |

*Primary Examiner*—Doris H. To
*Attorney, Agent, or Firm*—Dilworth & Barrese, LLP

[57] ABSTRACT

A method of managing system faults which enables system operators to easily detect the state of all the systems constituting the Home Location Register (HLR). Even when several sites are added, resulting in different system configuration, the inventive method can be easily applied to such configuration by introducing a novel technique in which the system operator prepares the graphics configuration capable of modifying only the data file as desired on the basis of the previously prepared programs without necessitating the help of professional programmers. The method enables reconfiguration to be separately applied to the sites irrespective of changes in the internal hardware and software structure, which results in the reduction of manpower and accordingly of the operating expenses. Furthermore, the visual and audio warning system for fault management provides the system operators with added convenience for system operation, and improved system reliability by reconfiguring the state information when an inconsistency between the actual system and the configuration information at the operation terminal occurs.

13 Claims, 17 Drawing Sheets

METHOD FOR MANAGING SYSTEM FAULT FOR CDMA HOME LOCATION REGISTER

BACKGROUND OF THE INVENTION

1. Field of the Invention

The present invention relates to a method for managing system faults in a Code Division Multiple Access (CDMA) system, and more particularly, to a method for enabling system operators to easily detect the states of all the systems constituting the Home Location Register (HLR).

2. Description of the Related Art

The HLR in the CDMA system includes a plurality of systems for performing the subscribers' location registering function, which plays a very important role within the CDMA system. Therefore, if the HLR system fails to function normally, the CDMA system cannot function properly. Such a CDMA HLR system usually consists of a front end processor (FEP) 20 for dealing with No. 7 part 15, a back end processor (BEP) 30 for the subscribers' database management, and an operation and maintenance processor (OMP) 10. The FEP 20, BEP 30, and OMP 10 are connected with the local area network by means of a socket for communications, and the internal communications within the system are effected by means of an internal process communication (IPC) message queue.

In early days, such HLR system included self-diagnosing and self-fault detecting functions, whereby the information relating to system faults are displayed in a text mode on the screen only by means of system console. Therefore, the system operator can not find the correct fault locations. Such early problems were eliminated by introducing the graphics display technique capable of displaying faulty objects on the screen in a graphics mode so that the operator can identify the correct fault locations.

By displaying faulty objects in graphics figures on the HLR system, the programer can predetermine the specifications with respect to the hardware shape information about the system in order to proceed with the faults and configuration management for all the systems, thereby performing the hard coding for creating graphics files. That is, whenever a new board is added to the system, the hard coding must be performed again so that the operator can recognize the relevant information corresponding to the newly added board.

Further, the fault displaying method primarily employs the visual color-related warning method for the fault management, through which the warning color varies depending on the fault level. In addition, an audio warning is provided irrespective of fault levels. When new fault information is added, it is newly coded by means of a separate coding technique which individually codes each fault according to the corresponding fault message when the fault arises. The corresponding fault information can be individually processed, and when the fault information doesn't conform to the fault code, the fault process is terminated and the fault information is repeated.

Through the conventional system configuration and fault management method, the detailed information of the complicated system must be separately coded up to the system board's level. Accordingly, every time the configuration information of the system is changed, the programer must prepare new hard codes. In addition, when the boards fail to operate individually, the fault events must be separately processed with respect to each board. In some cases, such event processing is accompanied by a hard coding operation.

Therefore, when the conventional fault management system is applied to several sites, new hard coding operations must be performed with respect to each site, and the management of software versions must be accompanied. Furthermore, since the conventional method employs only visual warnings to express the fault states, additional problems arise if the system operator is not near the system, making it difficult for them to identify the correct state of the system. This results in difficulties in fault management and system operation. Another drawback of the conventional method is that when there is an inconsistency in the fault information, the fault processing is terminated and then the fault information is freshly repeated. This results in a deterioration of the reliability of the system.

SUMMARY OF THE INVENTION

Accordingly, it is an object of the present invention to provide a fault management method of the HLR system capable of enabling operators to easily grasp the state of the system with respect of the hardware and software for the systems constituting the CDMA HLR system.

It is another object of the present invention to provide a fault management method capable of being easily applied without requiring programer's hard coding when the configuration of the system is variable.

It is further another object of the present invention to provide a fault management method capable of enabling operators to easily recognize the audio warnings when generated.

It is still another object of the present invention to provide a fault management method capable of restoring the normal state of the system in case of an inconformity of fault information.

It is still a further object of the present invention to provide a fault management method capable of securing the reliability of the HLR system.

According to the present invention, a method of managing system fault organizes the configuration information of the system into a data file. The data file is modified on the basis of individual sites even when there are several sites to be separately applied, so that the configuration of the system can be modified without the programer's additional hard coding.

Further, the method provides the basic visual warnings when a fault occurs while at the same time providing the audio warnings according to the fault levels so as to enable operators to easily verify the state of the system even from a remote place thus ensuring the convenience of system operation.

Furthermore, the present invention provides the system with a function for enabling operator to reorganize the system configuration information, when fault information is missing during transmission through network and several processors. The method initializes the current system information and checks the current state of the system to reorganize the system configuration information to be applied in order to solve any inconsistency between the actual fault information currently kept by the system and the previous fault information held by the maintenance terminal, thereby securing the reliability of the system.

The present invention will now be described more specifically with reference to the preferred embodiment and the drawings attached, and it is to be noted that like reference numerals and characters used in the accompanying drawings refer to like constituent elements throughout all drawings.

Besides, if necessary for avoiding ambiguities the functions and constitutions belonging to the prior art are omitted in the following description.

DETAILED DESCRIPTION OF PREFERRED EMBODIMENTS

Figure 1:
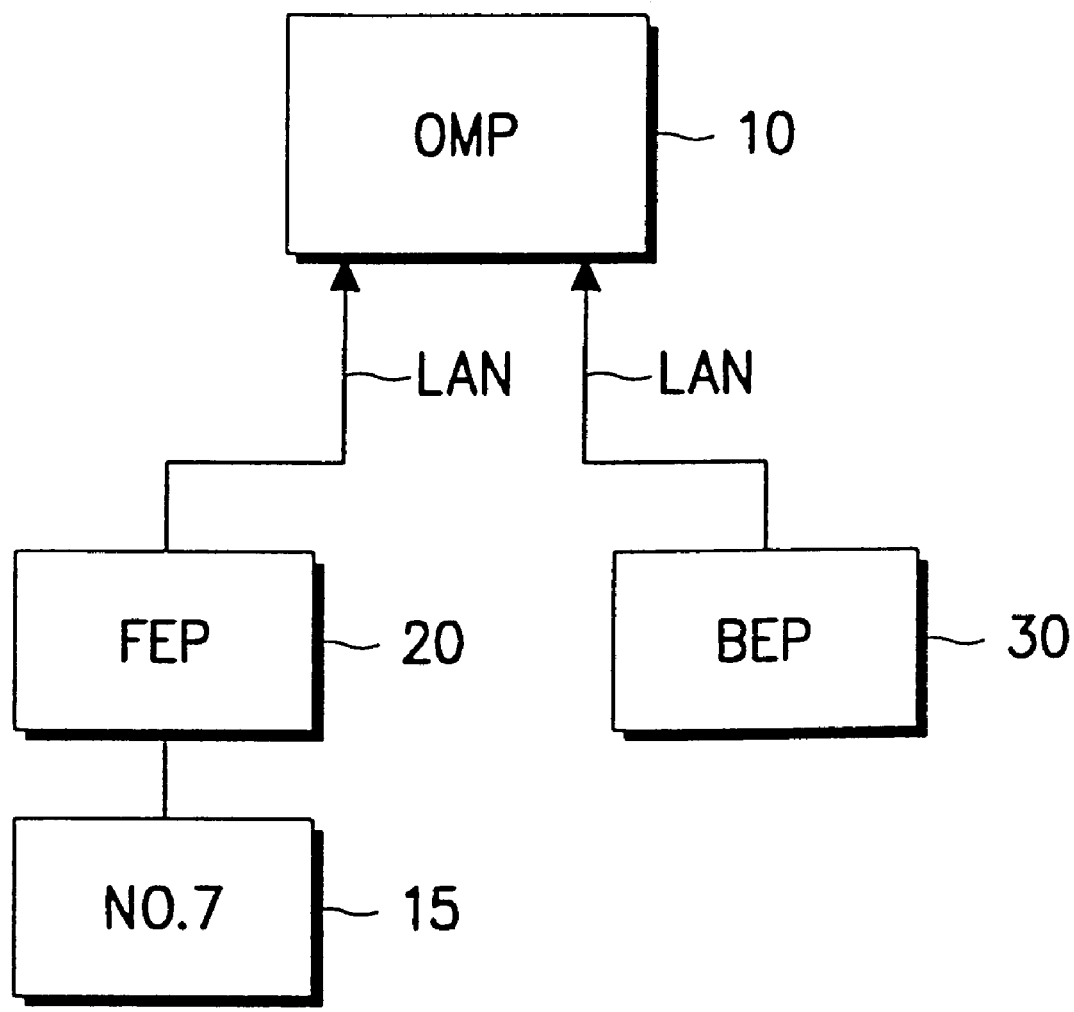
FIG. 1 is a block diagram illustrating the configuration of a conventional home location register system.
Figure 2:
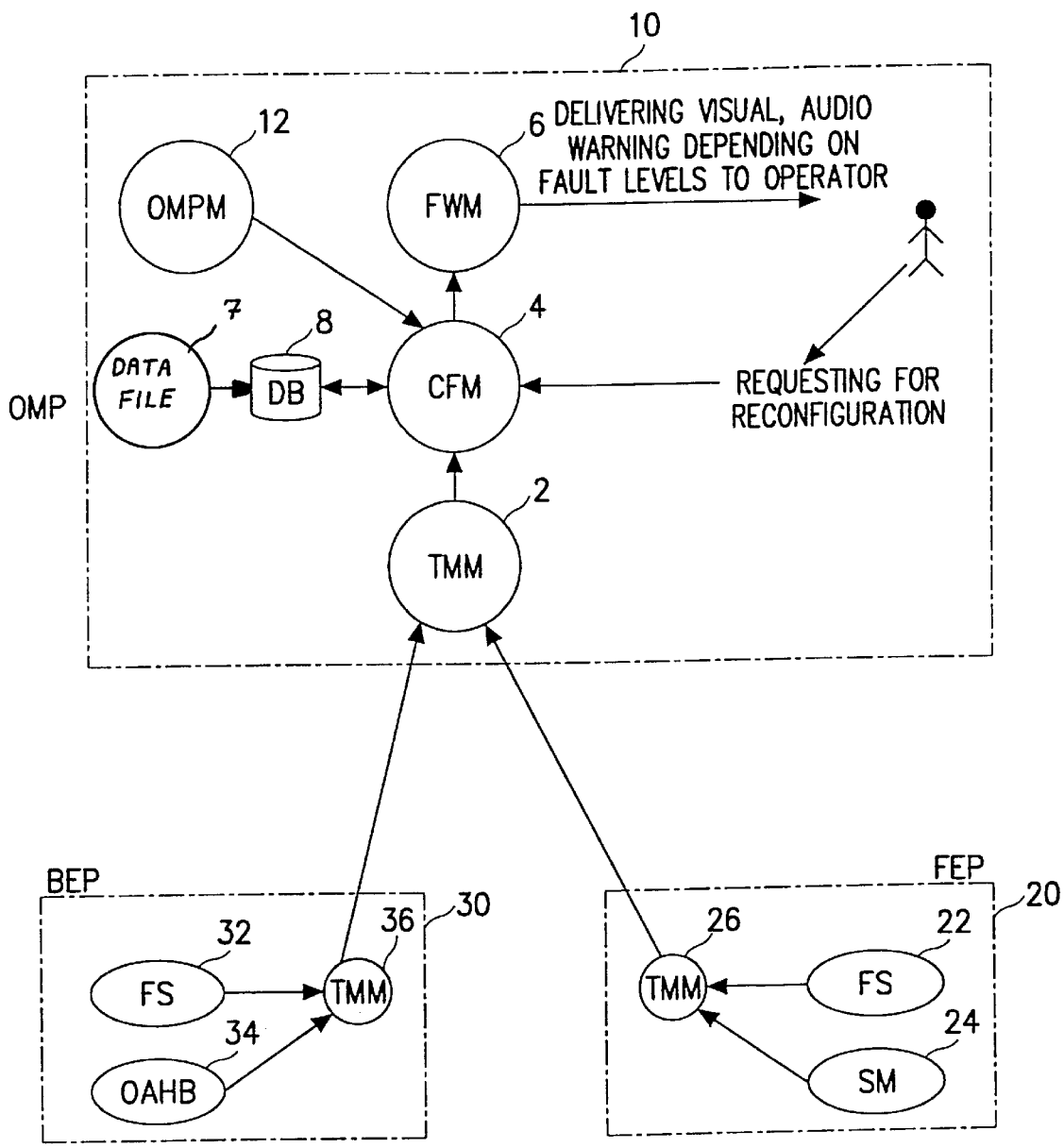
FIG. 2 is a block diagram illustrating the configuration of the home location register system according to an embodiment of the present invention.

Referring to FIG. 2, the home location register system according to an embodiment of the present invention includes a FEP 20, a BEP 30, and OMP 10 same as shown in FIG. 1. As illustrated in FIG. 2, each of FEP 20, BEP 30, and OMP 10 constitutes a fault-related software system. The configuration of the fault-related software within FEP 20 and BEP 30 in FIG. 2 is the same as that in FIG. 1.

The FEP 20 consists of a fault sender (FS) 22, a stack manager (SM) 24, and a transmission management module (TMM) 26, and the BEP 30 consists of a FS 32, an operator access handling block (OAHB) 34, and a TMM 36. The FSs 22 and 32 detect and report faults arising in FEP 20 and BEP 30 respectively. Each TMM 22, 36 and 2 included in FEP 20, BEP 30, and OMP 10, respectively, transmits data through a socket between FEP 20, BEP 30, and OMP 10. SM 24 included in FEP 20 checks and reports the state of the software within FEP 20, and the OAHB 34 checks and reports the state of the software within BEP 30.

The configuration of the fault-related software of OMP 10 includes a TMM 2, a configuration fault management (CFM) 4, a fault window module (FWM) 6, a data base (DB) 8, and an OMP manager (OMPM) 12. The CFM 4 controls the configuration data of FEP 20 and BEP 30, and detects and reports faults, and the FWM 6 graphically displays the system states of FEP 20, BEP 30, and OMP 10. The OMPM 12 controls the entire process of OMP 10 and reports the process state.

The overall flow of the fault management according to an embodiment of the present invention is described as follows:

When a hardware fault occurs: FS 22 of FEP 20 or FS 32 of BEP 30 collects fault information and transmits it via message queue to TMM 26 or 36, respectively. The TMM 26 or 36 transmits it through socket to TMM 2 of OMP 10. TMM 2 transmits the fault information via a message queue to CFM 4, and CFM 4 updates DB 8 on it and further transmits it to FWM 6. FWM 6 generates visual and audio warnings according to the fault content by means of GUI screen 10 and audio device 16.

When a software fault occurs: in case of FEP 20 and BEP 30, SM 24 and OAHB 34 each collect fault information and transmit it to TMM 26 and 36 respectively, and the remaining process is the same as that of the process flow of the above hardware fault. In case of OMP 10, OMPM 12 collects fault information and transmits it to CFM 4, and the remaining process is the same as that of the process flow of the above hardware fault.

Figure 3:
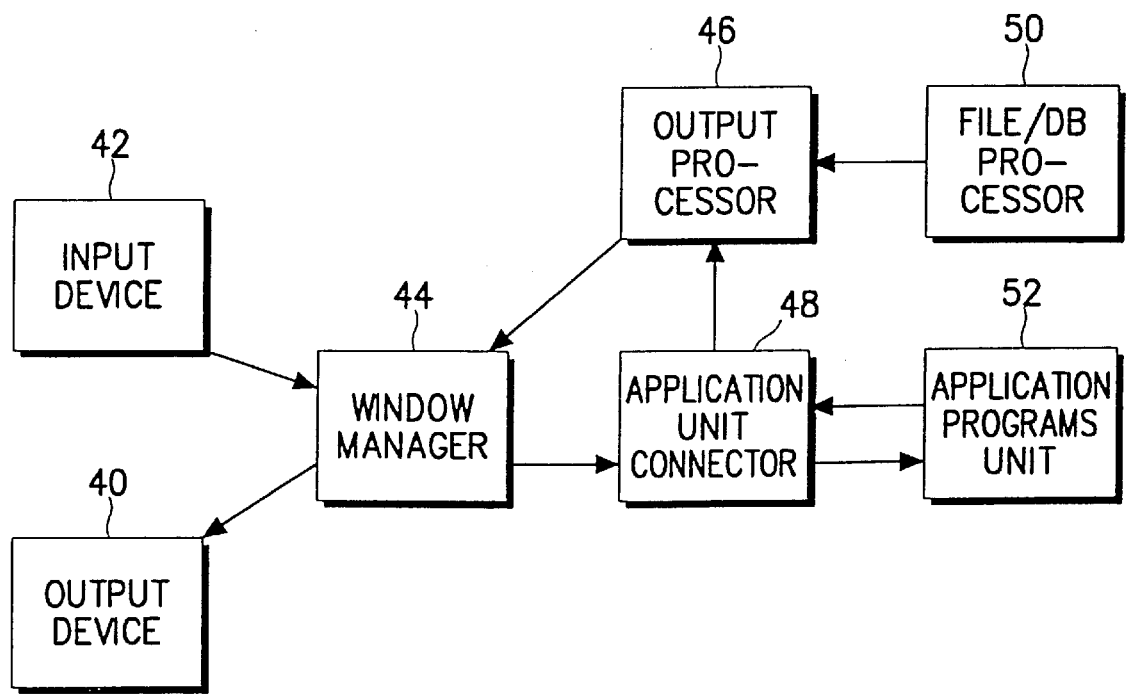
FIG. 3 is a block diagram illustrating the hardware for processing the fault and configuration information in the operating and maintenance processor (OMP) according to an embodiment of the present invention.

FIG. 3 is a block diagram illustrating the hardware for processing the fault and shape information in OMP 10 and showing the internal configuration of the system enabling the user interface. The above user interface can be implemented, for example, by means of X-window. Referring to FIG. 3, the output device 40 consists of a printer, a speaker, and a terminal, etc., thereby printing out fault information in text and generating audio warnings when fault information is produced. The input device 42 consists of a mouse, a keyboard, etc. so that the operator can manipulate the display screen.

The window manager 44 controls input device 42 and output device 40 to appropriately allocate input data to the application unit connector 48 when receiving input from the operator, and also activates output device 40 according to the information received from output processor 46 so that the operator can get the system information.

The output processor 46 analyzes the shape information received from file/DB processor 50 and the system state information received from application unit connector 48 to determine the appropriate output form and further instruct window manager 44 thereof.

The application unit connector 48 receives information from application programs unit 52 which analyzes the state information of the system and further transmits it to output processor 46. In addition, application unit connector 48 receives input from window manager 44 to further assign messages to the corresponding application program of the application programs unit 52.

The application programs unit 52 analyzes the actual system configuration information and transmits the resulting data to application unit connector 48. The file/DB processor 50 retrieves the initial system configuration information from the file/DB and transmits the retrieved information to output processor 46, thereby displaying the initial system information.

Figure 4:
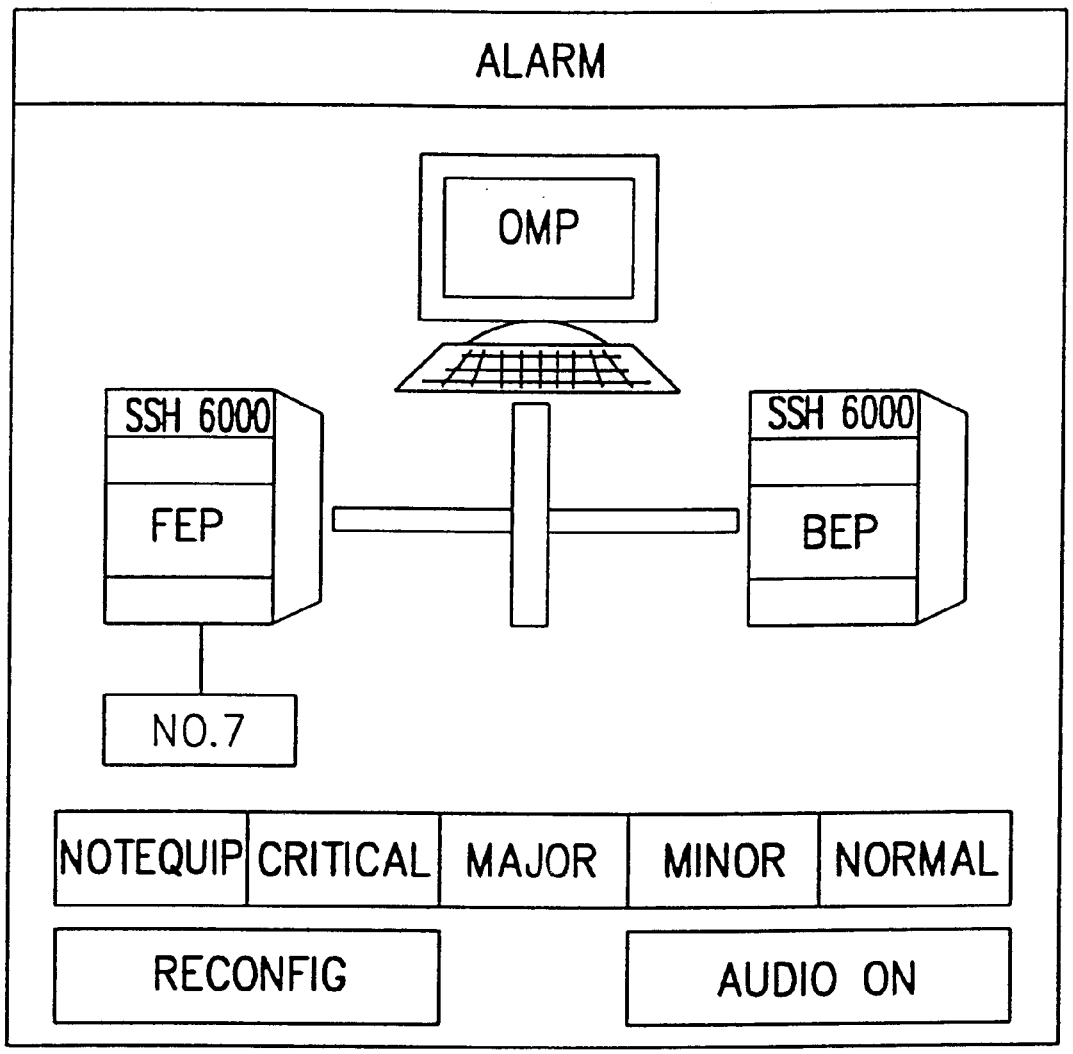
FIG. 4 is a graphic configuration of a main screen for fault management according to an embodiment of the invention.
Figure 5:
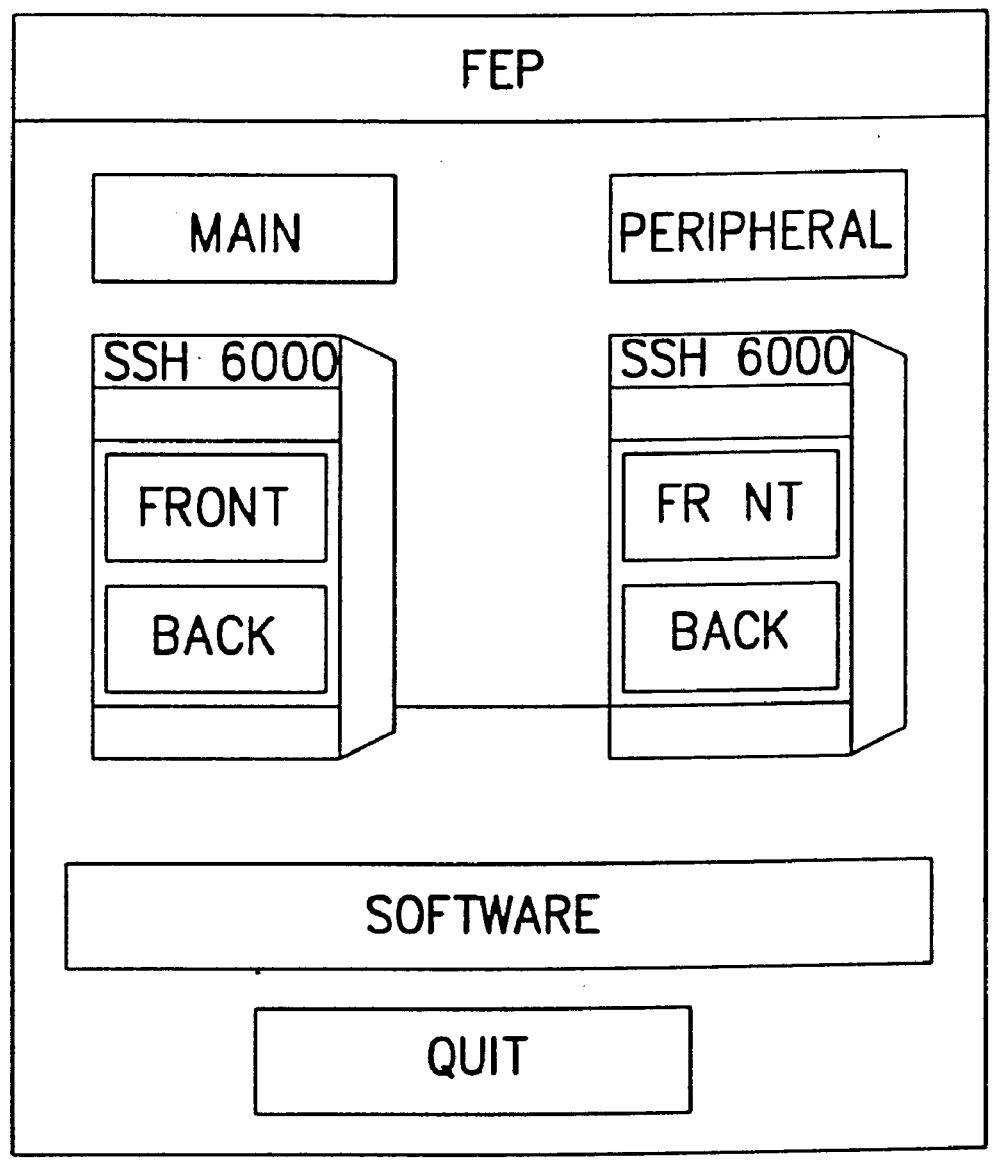
FIGS. 5 and 6 illustrate the graphic configurations of the system screens of a front end processor (FEP) and a back end processor (BEP), respectively.
Figure 6:
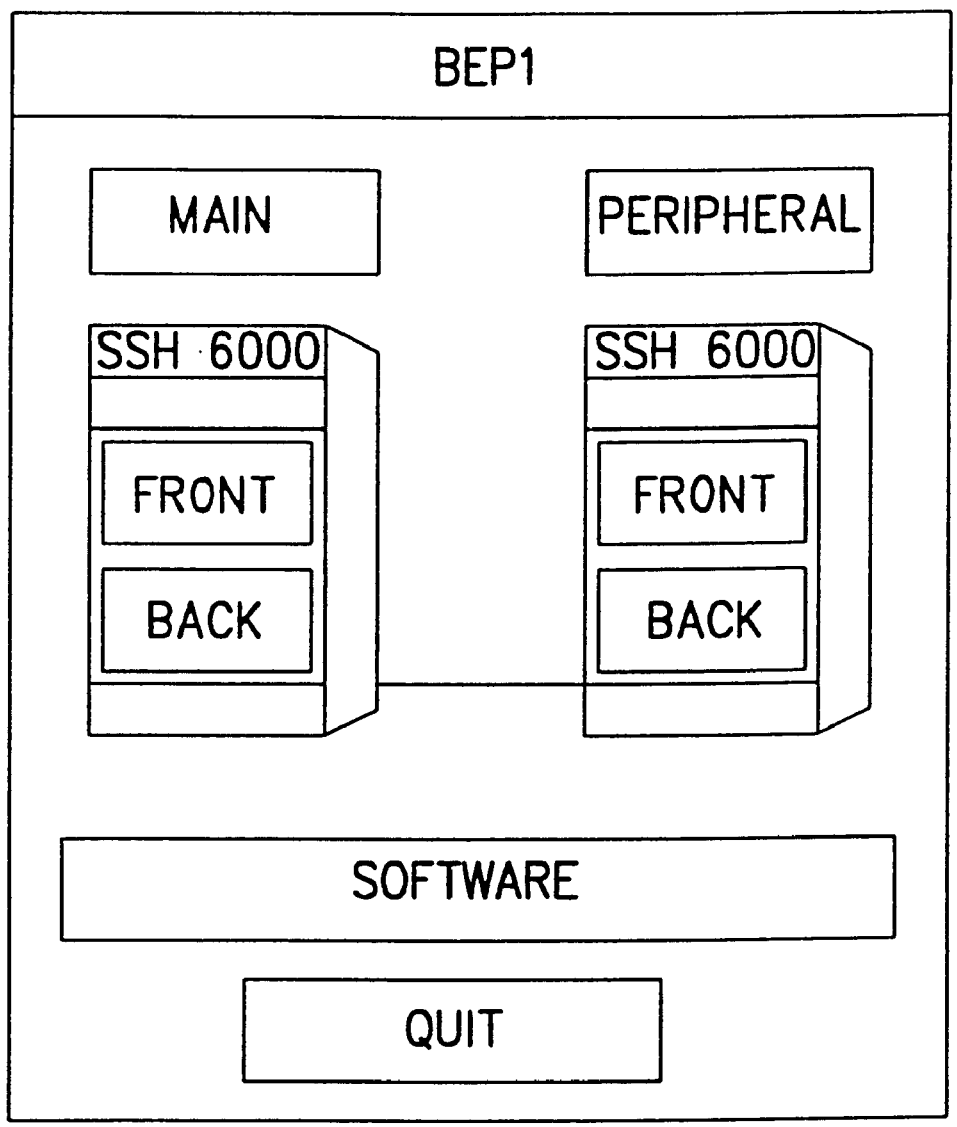
Figure 9:
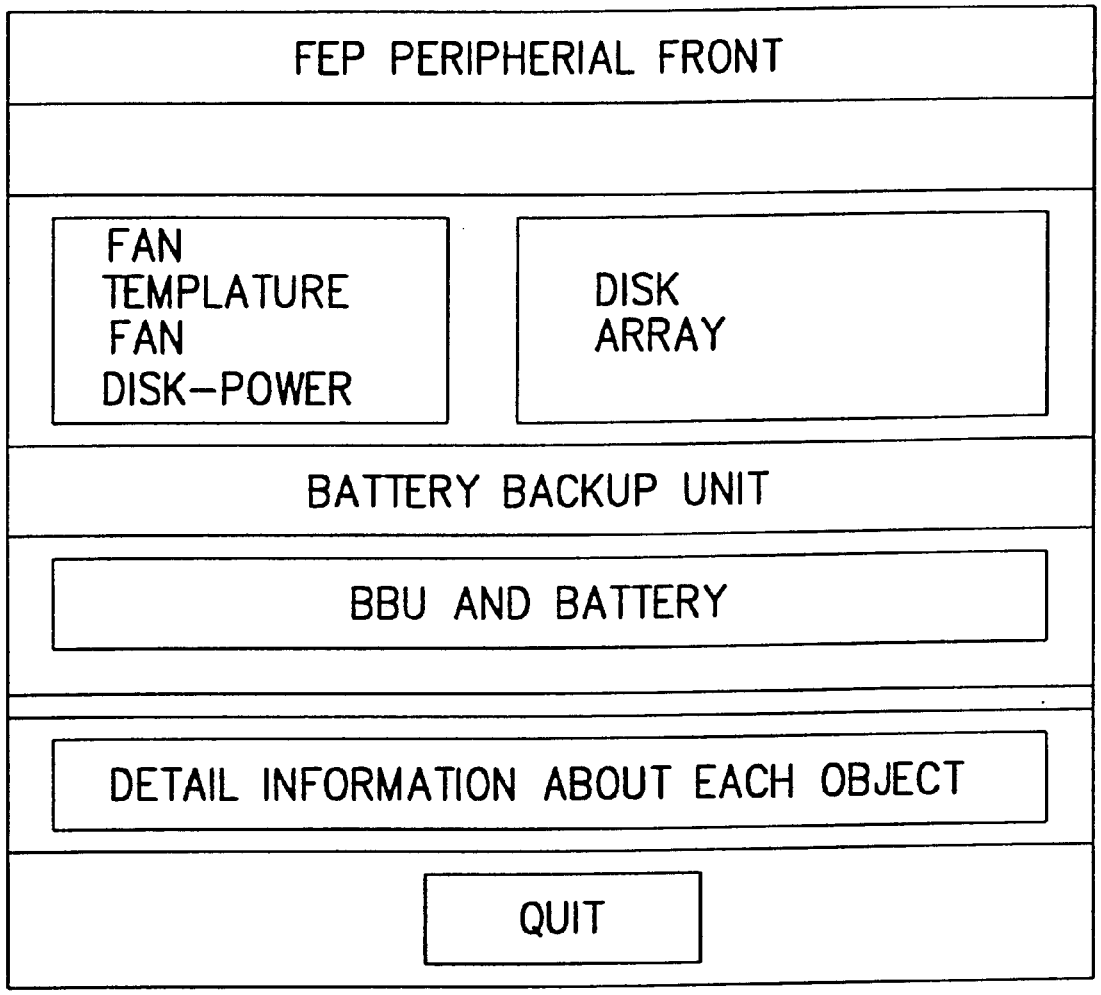
FIG. 9 illustrates the graphic configuration of the front end processor peripheral front screen displaying a board mounted in the front side.
Figure 10:
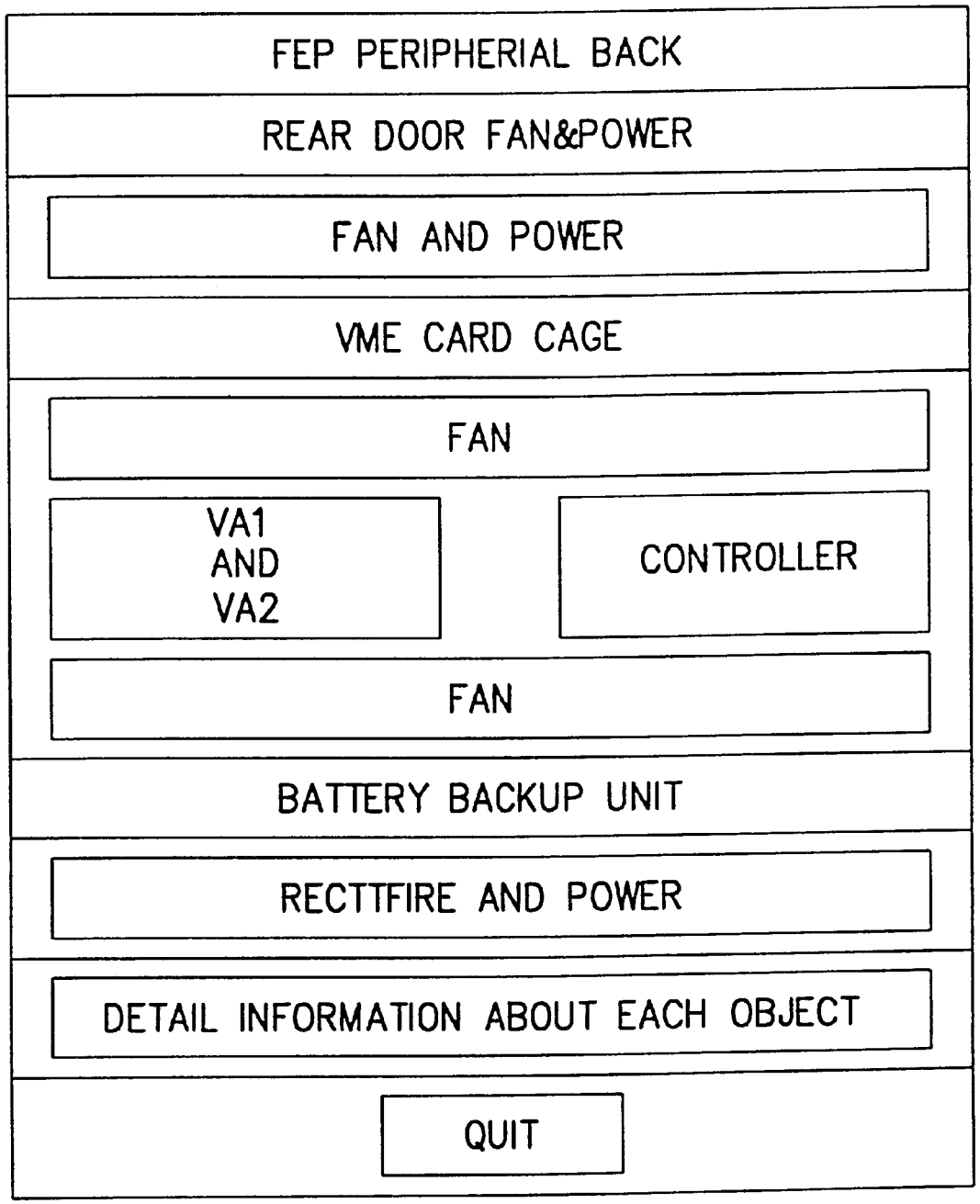
FIG. 10 illustrates the graphic configuration of the front end processor peripheral back screen displaying a board mounted the back side.
Figure 11:
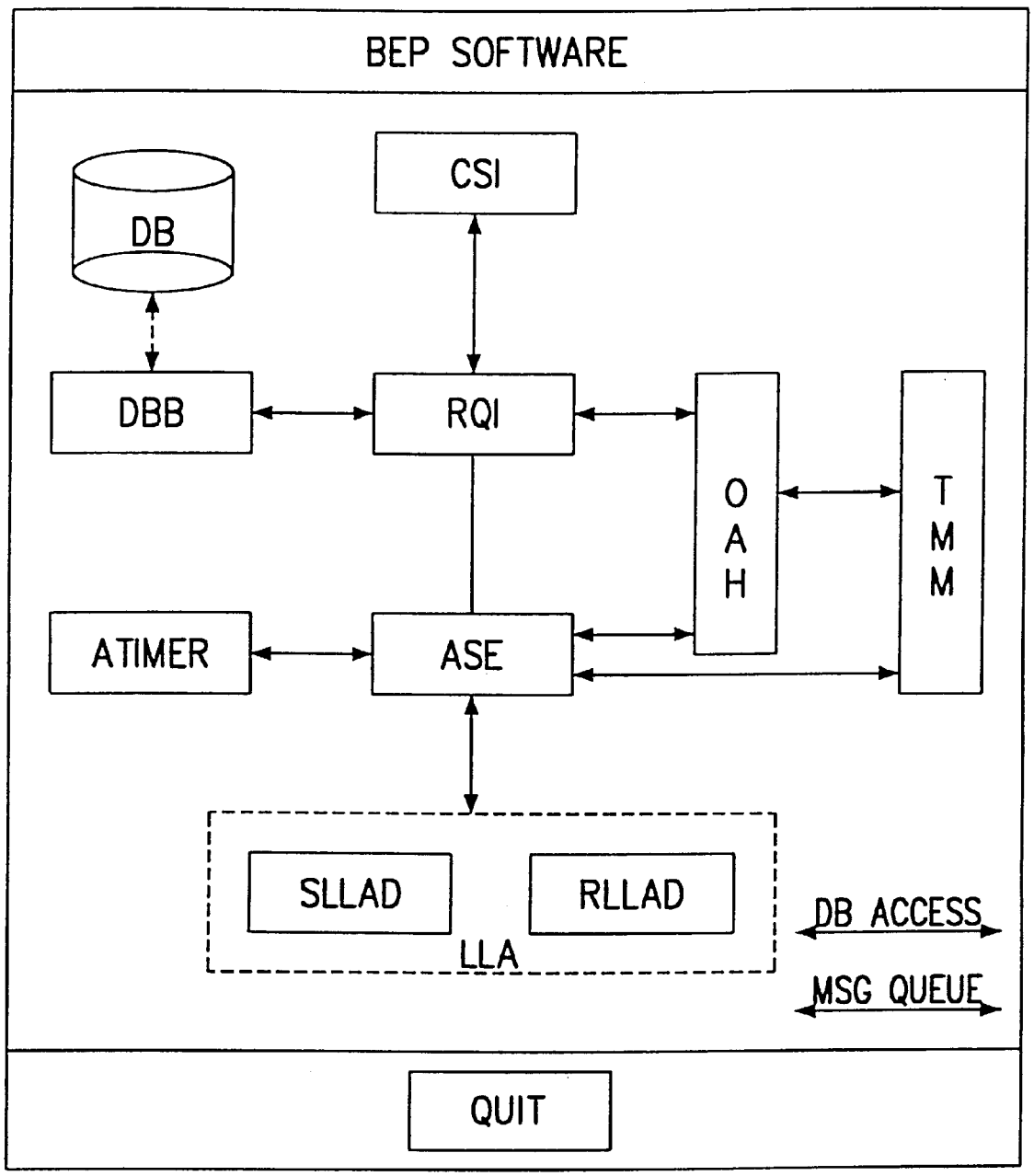
FIGS. 11–13 illustrate the graphic configurations of the software screen for the BEP, FEP and OMP, respectively.
Figure 12:
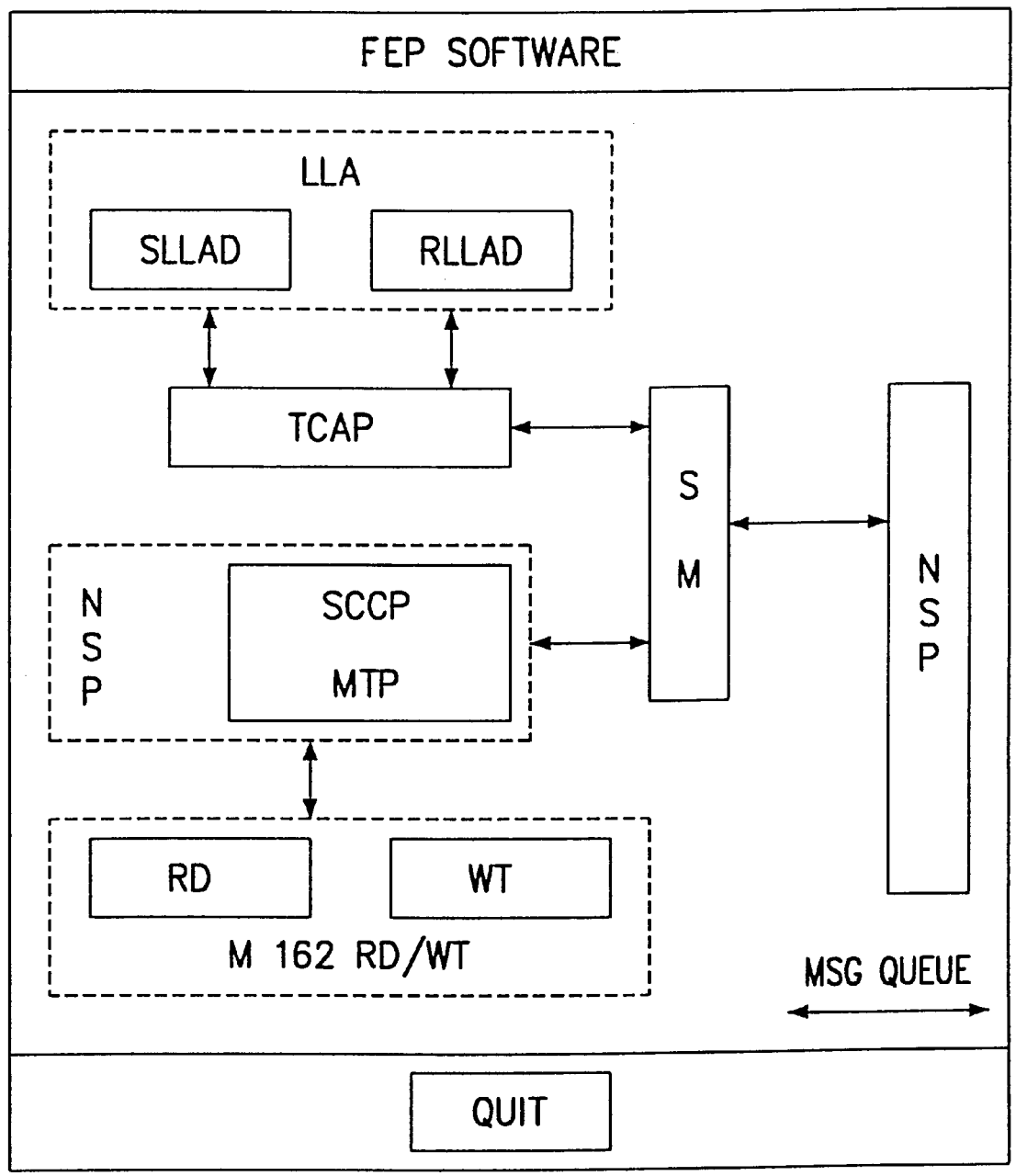
Figure 13:
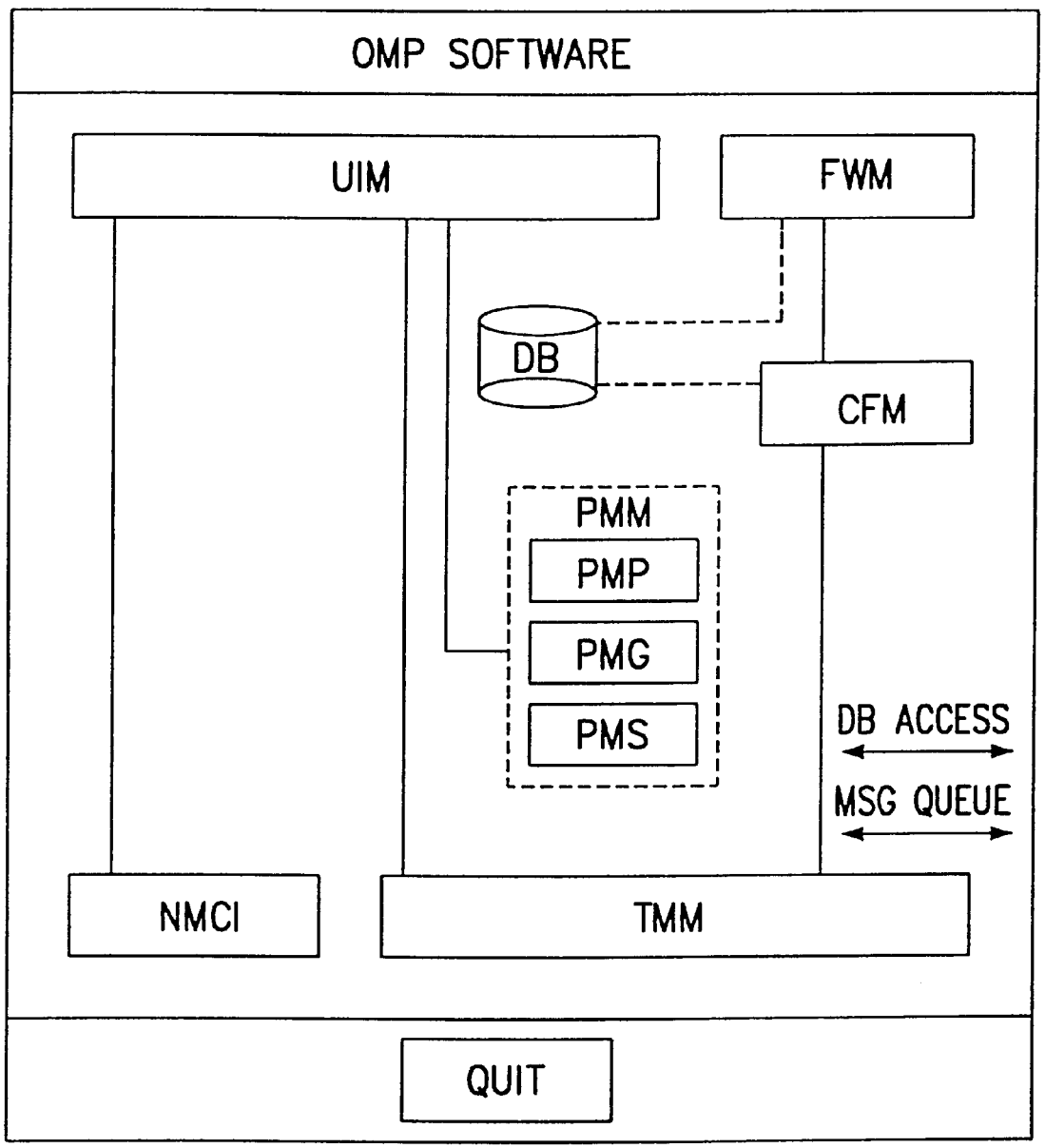

In a preferred embodiment of the present invention, the faults graphics comprise a main screen as shown in FIG. 4, system screens as shown in FIGS. 5 and 6, board mounting screens as shown in FIGS. 7–10, and software screens as shown in FIGS. 11–13. The main screen graphic as shown in FIG. 4 includes a combination of shapes (OMP, FEP, BEP) of the main system representing the states of the lowest board levels of the entire system when managing several systems. This enables the operator to get a complete view of the entire state of the system. The OMP shape represents the software fault state of OMP 10 of FIG. 2, the FEP and BEP shapes represent the hardware and software fault states of each the FEP 20 and BEP 30 of FIG. 2.

Referring to FIG. 4, "NotEquip", "Critical", "Major", "Minor", and "Normal" represent the visual warnings, wherein "NotEquip" is displayed in black color, "Critical" in red color, "Major" in orange color, and "Normal" in green color. The "Reconfig" is the reconfiguration button used for the reconfiguration of the system state information, and the "Audio ON" is the audio warning ON/OFF button.

Referring to FIGS. 5 and 6, to display the configuration information of the systems FEP 20 and BEP 30, respectively, on the screen, the system screen graphics comprise a hardware front view (represented by "Front") displayed by combining the states of boards mounted in the front side, a hardware rear view (represented by "Back") displayed by combining the states of boards mounted in the rear side, and a software screen (represented by "Software") displayed by combining the states of processes to be performed within the systems FEP 20 and BEP 30. This enables the operator to systematically check the states of the systems of FEP 20 and BEP 30.

Figure 7:
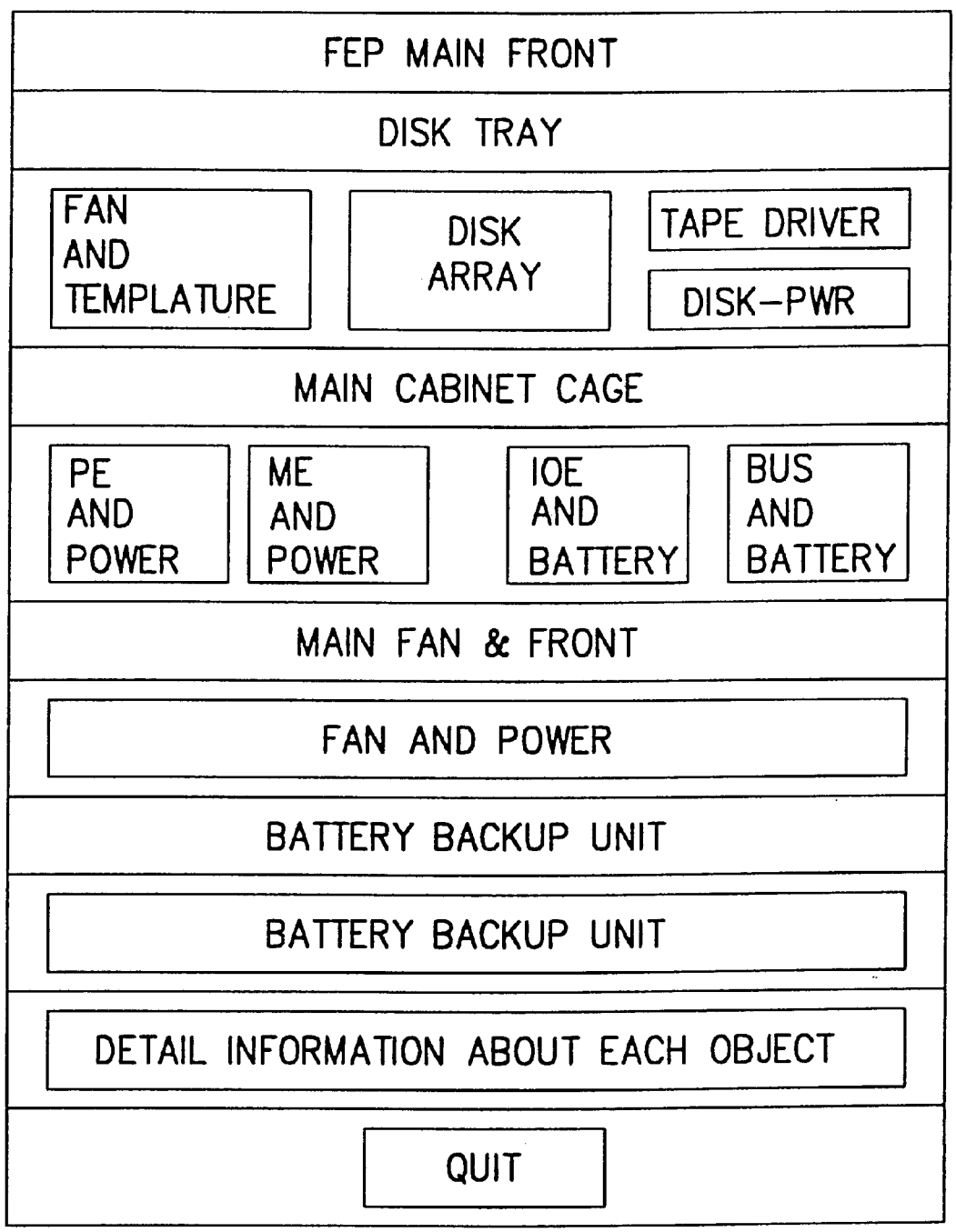
FIG. 7 illustrates the graphic configuration of the front end processor main front screen.
Figure 8:
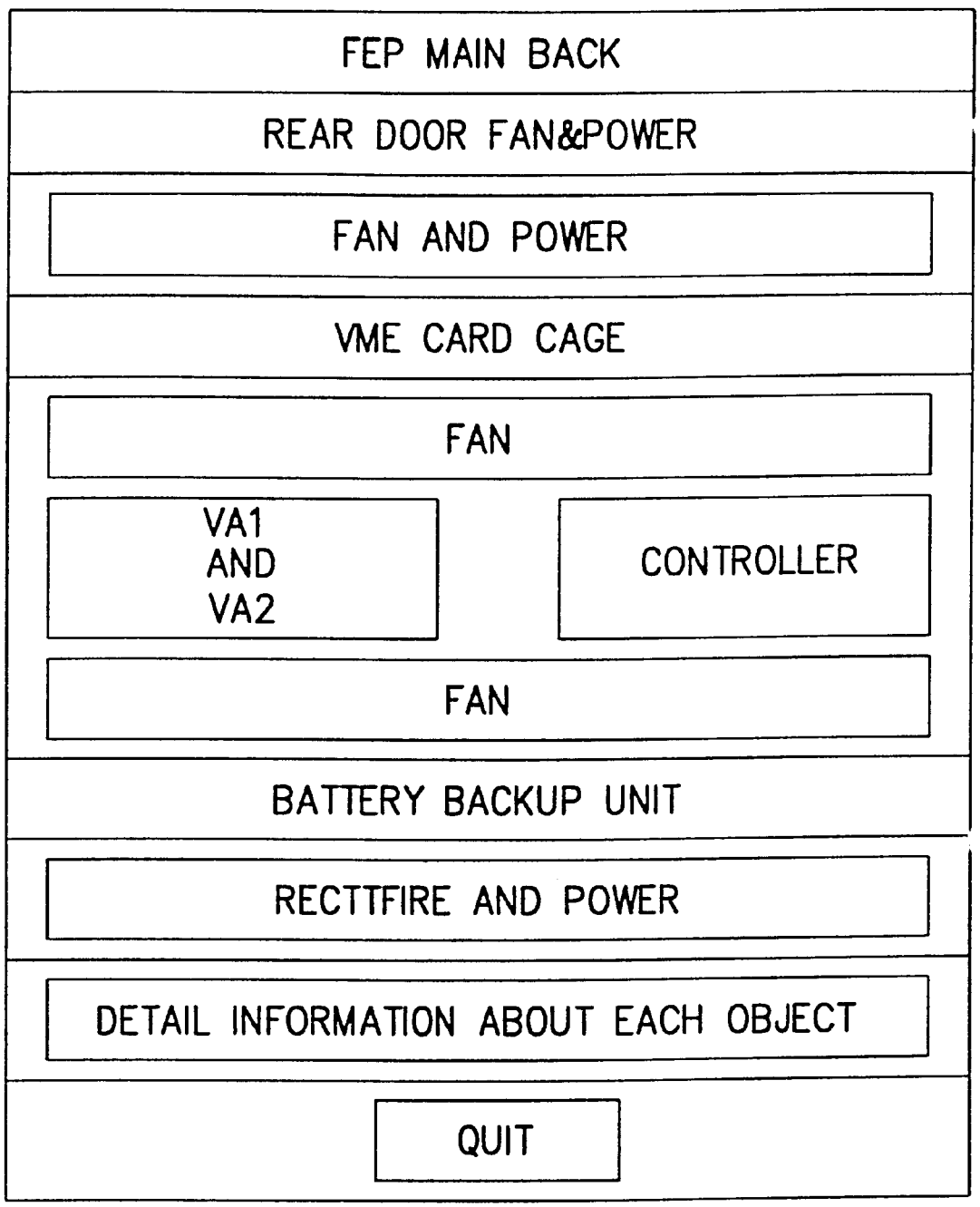
FIG. 8 illustrates the graphic configuration of the front end processor main back screen.

In the board mounting screen graphics as shown in FIGS. 7–10, the states of boards mounted in the front and back sides of FEP 20 and BEP 30 are displayed on the screen, wherein FIG. 7 illustrates the main front screen of FEP 20, FIG. 8 shows the main back screen of FEP 20, FIG. 9 illustrates the peripheral front screen graphics of FEP 20, and FIG. 10 shows the peripheral back screen graphics. The software screen graphics of FIGS. 11–13 illustrate the software screens displaying the states each corresponding to the respective processes to be permanently performed within the systems of FEP 20, BEP 30, and OMP 10, wherein FIG. 11 shows the software screen of BEP 30, FIG. 12 illustrates the software screen of FEP 20, and FIG. 13 is the software screen of OMP 10.

When conducting the hard coding to prepare graphic files for all the screens in order to configure the individual screens as shown in FIGS. 4–13, the system resources such as memory and process loading time are generally used. To avoid the frequent use of such system resources, the present invention employs a technique in which the desired detail screen can be opened from the top screen, and the state information to be displayed on the detail screen is retrieved from the data file 7 or database 8, so that the system resources can be economized.

Figure 14:
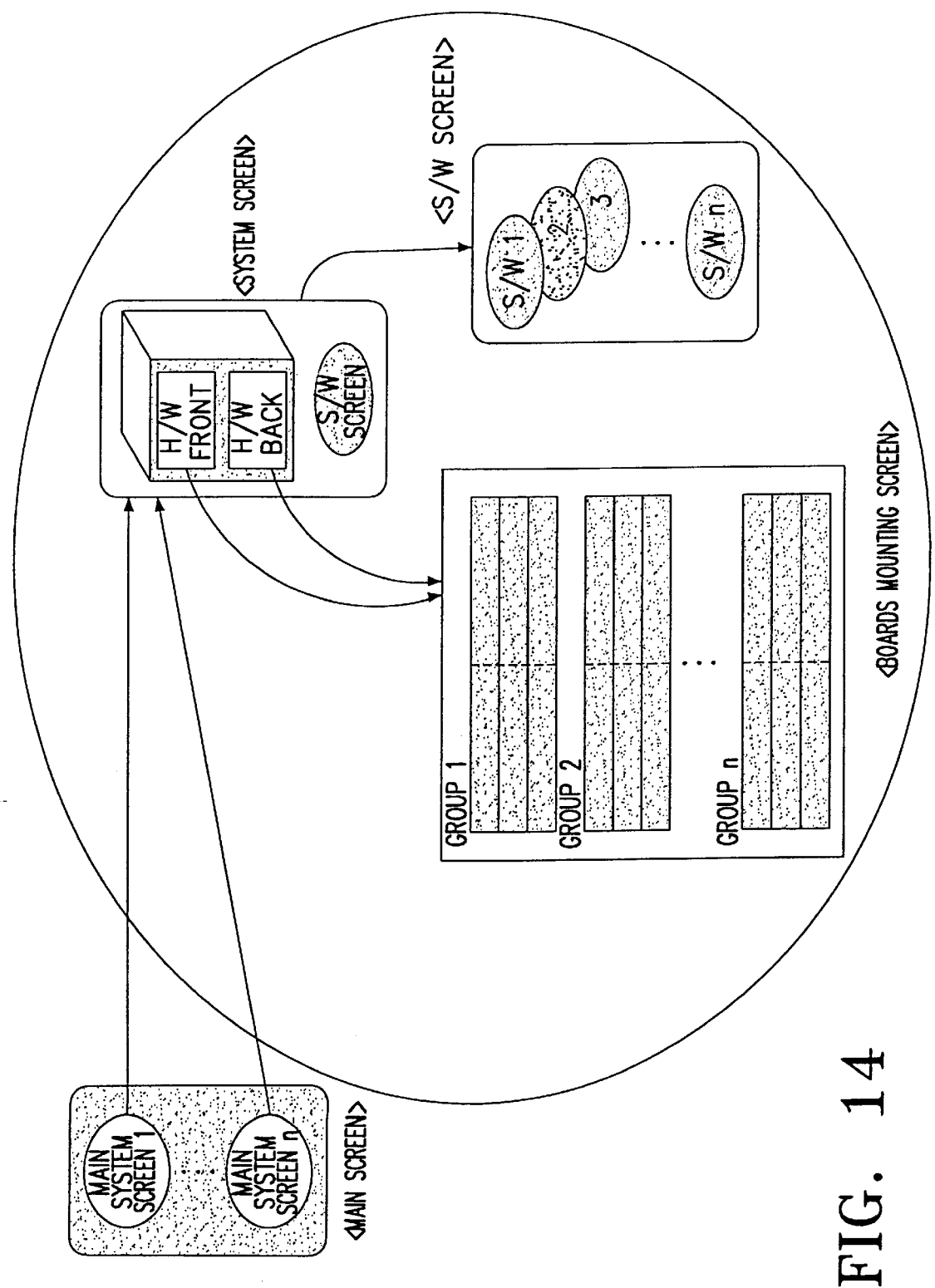
FIG. 14 is a descriptive diagram illustrating a deployment method for the faults screens according to an embodiment of an present invention.

Referring to FIG. 14, the deployment of fault screens is implemented in top-down fashion with respect to the configuration and fault information of the entire system. This enables the operator to easily get a complete view of the system states. That is, when selecting a desired system from the main screen as shown in FIG. 4, the desired system screen of FIG. 5 or FIG. 6 is displayed, and when selecting a desired object (from among main, peripheral, front, back, software), one of the board mounting screens or software screen corresponding to the respective FIGS. 7–10 is displayed. As illustrated in FIG. 14, the GUI screens are displayed by steps, so that the operator can easily grasp the system states on the whole and in detail.

The inventive method according to the present invention performs the initialization, reconfiguration, and fault events processing for the fault management. FIGS. 15a and 15b are flow charts illustrating the initializing process according to an embodiment of the present invention. FIGS. 16a and 16b are flow charts illustrating the reconfiguring process according to the embodiment of the present invention, and FIG. 17 is a flow chart illustrating the fault events processing according to the embodiment of the present invention.

First, the initialization process according to the embodiment of the present invention is described as follows. Since the entire internal configuration of the CDMA HLR system is variable depending on the arrangement of internal equipment, the screen graphics are configured to full mountings so that the maximum amount of internal equipment can be included at the time of initial screen configuration, and the graphics figure can be changed according to the changes of the configuration-related data stored in the database.

To be more concrete, the hardware is classified into main cabinet and peripheral cabinet depending on its configuration, and into front and back sides depending on board locations, thereby displaying all the boards as is the case of full or maximum mountings. Further, since the present invention employs the technique in which all the equipment is first initialized to the "Not-equip" state, and the current state of the system is displayed by receiving the state information of the equipment from the CFM 4, the variableness is imparted to the graphics displaying.

Figure 15:
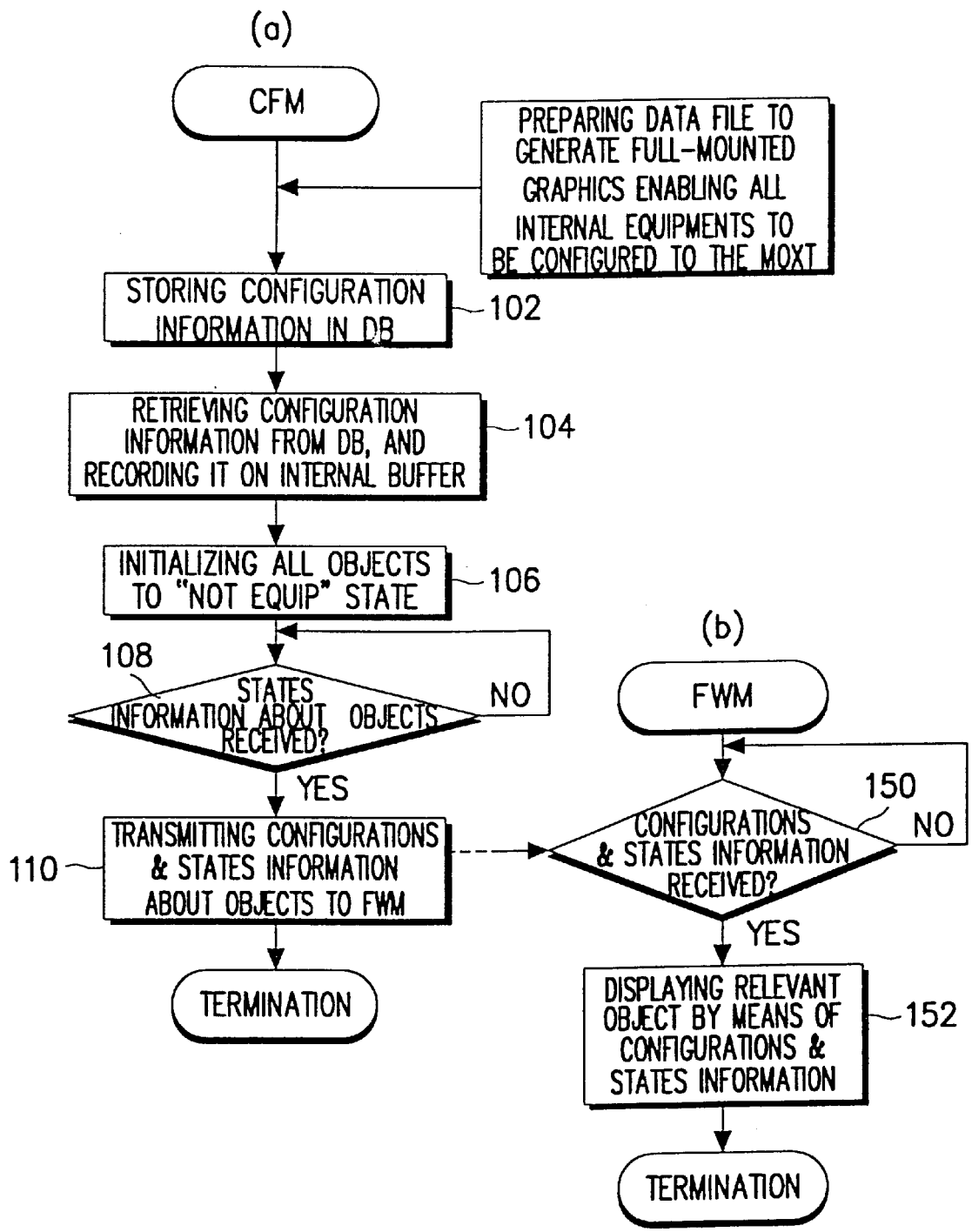
FIGS. 15a and 15b are flow charts illustrating the initializing process according to an embodiment of the present invention.

Referring to FIGS. 2 and 15, the initializing operation is a procedure in which the configuration data is retrieved from a data file storing configuration information about all the systems up to the board level, which generate visual and audio warnings so as to be easily recognized by the operator. Referring to FIG. 15, the (a) process is performed in the configuration fault manager (CFM) 4 of FIG. 2, and the (b) process is performed in the fault window monitor (FWM) 6 of FIG. 2. The data file in which the configuration information about all the systems up to the boards level is stored is prepared in advance before commencing with the initializing operation.

At step 102, the CFM 4 retrieves the previously prepared configuration data from the above data file and stores the data in DB 8, and thereupon proceeds to step 104 to expedite the processing speed. In step 104, the CFM 4 retrieves the configuration information from DB 8 and further records it into an internal buffer. The CFM 4 then initializes all objects of every system into the "Not-equip" state (step 106), and accordingly all objects expressed in graphics are colored in black. The CFM 4 proceeds to step 108 and checks whether the hardware or software state information is received from the system's FEP 20 and BEP 30 and whether the software state information is received from the system OMP 10. When the state information is received, the CFM 4 proceeds to step 110 to analyze the received state information, thereby retrieving the configuration information corresponding to the received state information from the internal buffer and transmitting the above configuration and state information to FWM 6.

When receiving the configuration and state information in step 150 of the (b) process of FIG. 15, the FWM 6 further proceeds to step 152 to visually and audibly express the state of the graphics figure of the relevant object by means of the above configuration and state information. The visual expression of the state varies depending on the fault levels, whereby if the fault state is critical, it is expressed by the color red. The major state is expressed by the color orange, the minor state is expressed by the color yellow, and the normal state is expressed by the color green. The audio warning employs different audible sounds according to the individual fault levels based on the fault information.

The re-configuring operation according to the embodiment of the present invention is described in the following. The present invention is provided for the change of the configuration information such as addition and deletion of internal equipment during system operation, and the inconsistency between the actual system fault state information and the graphics information due to the missing of the fault information in the course of passing through a LAN and internal IPC. To prepare for such events, a re-configuration ("Reconfig") button is provided on the main screen as shown in FIG. 4.

Figure 16:
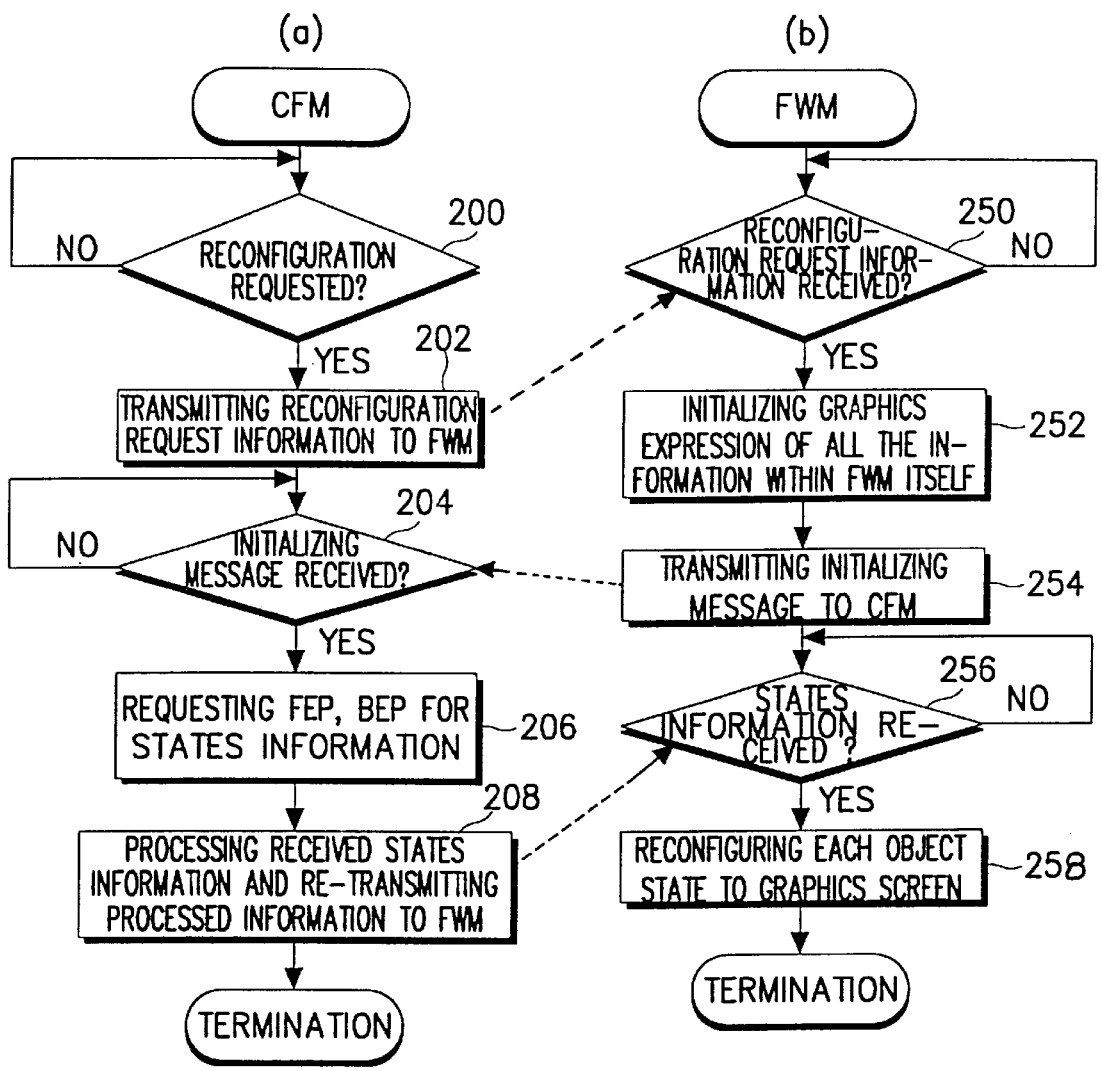
FIGS. 16a and 16b are flow charts illustrating the reconfiguring process according to an embodiment of the present invention.
Figure 17:
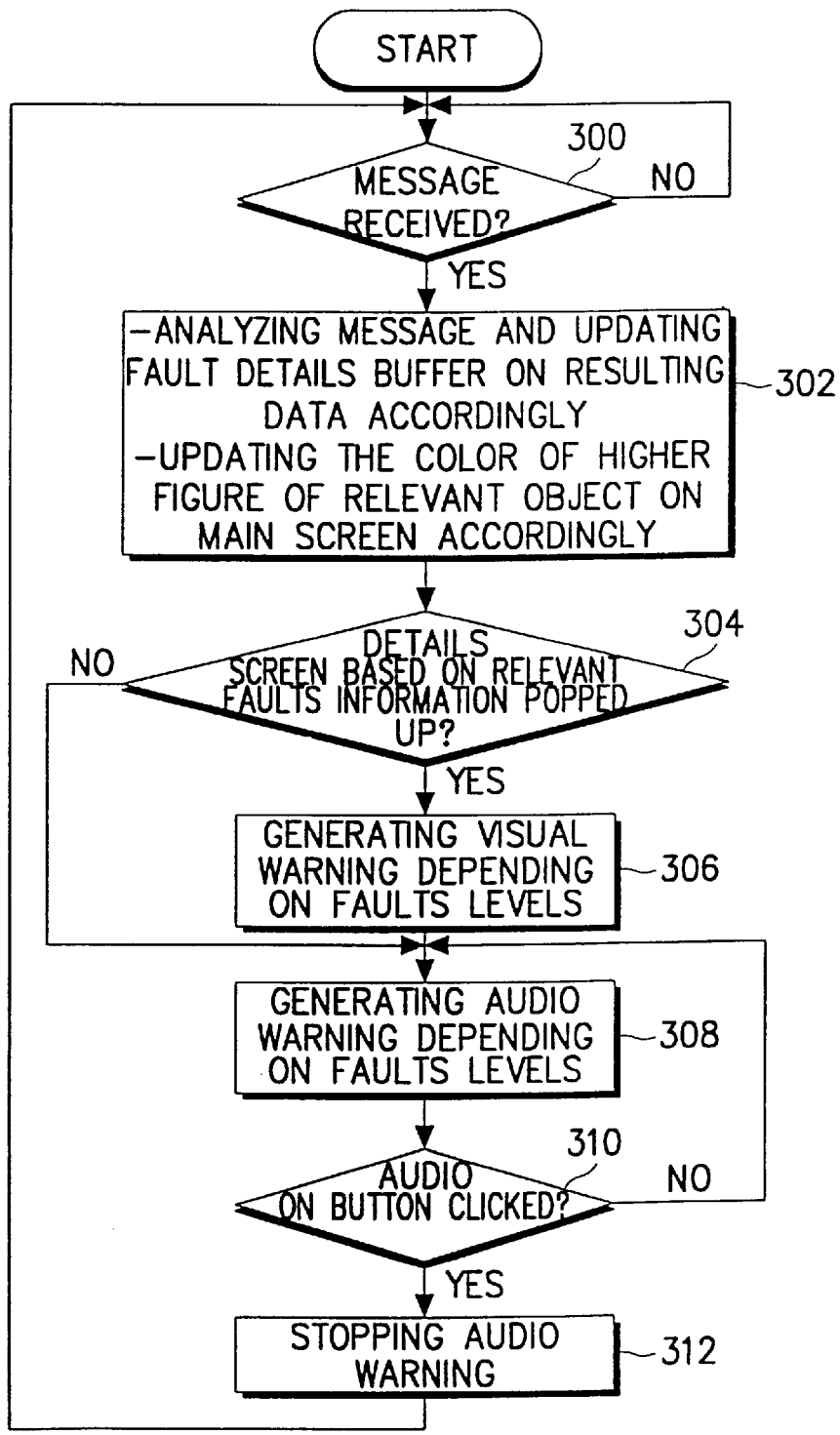
FIG. 17 is a flow chart illustrating the fault events processing according to an embodiment of the present invention.

When there is an inconsistency of the system fault state information with respect to the graphics information, CFM 4 and FWM 6 perform the re-configuring operation as shown in FIG. 16 when requested by the operator. When the operator presses or clicks the "Reconfig" button on the main screen by means of the keyboard, a mouse, or other input device, the CFM 4 proceeds from step 200 of the 16(a) process to step 202 to transmit the re-configuration information to FWM 6. When the reconfiguration information request is received in step 250 of the 16(b) process, the FWM 6 proceeds to step 252 to initialize the graphics expression for all the information within the FWM itself, thereupon transmitting the initializing message to CFM 4 in step 254.

When receiving the above initializing message in step 204, the CFM 4 proceeds to step 206 of the 16(a) process. In step 206, the CFM 4 requests the states of all the objects included in the current FEP 20 and BEP 30 systems. When the state information in step 206 is received, the CFM 4 proceeds to step 208 to process the received state information, and further delivers the resulting data back to FWM 6. When receiving the state information in step 256 of the 16(b) process, the FWM 6 proceeds to step 258 to reconfigure each object state to the graphic screens. This reconfiguration step eliminates any inconsistency in the state information.

Lastly, the operation of the fault event processing is described as follows. When the display screen consists of multiple stages, the expression of the fault states in a graphic mode is problematic in that the desired screen can be intermittently be displayed or not displayed at all when requested by the operator. Therefore, if the desired screen is not verified, the reliability of fault management fatally suffers.

FIG. 17 is a process flow chart illustrating the procedure of processing the system fault information to solve the above problem according to the embodiment of the present invention. Referring to FIG. 17, in step 300 when a fault information message transmitted through CFM 4 from several faulty objects is received, the FWM 6 proceeds to step 302 to analyze the received information. The internal fault details buffer is updated, and the color of the higher configuration of the relevant object presented within the main screen (as shown in FIG. 4) is updated accordingly depending on the fault levels.

Thereafter, the FWM 6 proceeds to step 304 to check whether the detailed screen corresponding to the relevant fault has appeared (i.e., popped up) on the current screen. If the relevant screen is displayed on the screen, the FWM 6 proceeds to step 306 to generate visual warnings corresponding to the figure of the relevant object. The visual warnings are classified into four levels, in which if the fault state is critical, it is expressed by a red color, major state is expressed by an orange color, minor state is expressed by a yellow color, and the normal state is expressed by a green color. If the state information of the related object is not received, the related object is processed to the "Not Equip" state and is expressed in a black color.

To give an example for generating visual warnings, assuming that a critical fault has occurred in the battery backup unit among the hardware components on the main front screen as shown in FIG. 5, and the FEP main front screen is displayed as shown in FIG. 7. Then, the "FEP" shape shown in FIG. 4 blinks red, and the "Front" shape shown in FIG. 5 blinks red, and the "Battery Backup Unit" shape in FIG. 7 blinks red. If the related fault screen is not currently displayed, the visual warning color is not updated. The related fault screen can be popped up (i.e., displayed) on the current screen by clicking the main system shape on the main screen by means of the mouse or other input device.

After expressing the related object figure on the respective screen in colors in step 306, or without generating the color expression, the FWM 6 proceeds further to step 308 to generate audio warnings depending on the fault levels. The audio warning varies depending on critical, major, or minor states.

After checking the current state of the system, the operator can suppress (stop) the audio warning. When the operator clicks the "Audio ON" button always displayed on the main screen (as shown in FIG. 4), the FWM 6 recognizes the corresponding signal through CFM 4. Then, in step 310, the FWM 6 recognizes the clicking of "Audio ON" button and further proceeds to step 312 to stop the audio warning.

As described above, it can be noted that the present invention employs an novel technique in which if a fault occurs on the board level and software level, the state of the higher level is represented by combining fault states based on the fault levels assigned to each object.

In the system configuration and fault management method for general systems, the present invention has the advantage that even when several sites are added, resulting in a different system configuration, the inventive method can be easily applied to such configuration by introducing a novel technique in which the system operator prepares the graphics configuration capable of modifying only the data file as desired on the basis of the programs prepared in advance without necessitating the help of professional programers. The modifications are separately applied to the sites respective to the changes of the internal hardware and software structure, which results in the reduction of manpower and accordingly of the operating expenses. Furthermore, the visual and audio warning system for the fault management provides the system operators with added convenience for system operation, and the system reliability can be improved by introducing a solution to the problem of inconsistencies between the actual system and the configuration information at the operation terminal.

What is claimed is:

1. A method of managing system fault in a CDMA home location register (HLR), comprising the steps of:

preparing full-mounted configuration information in a graphics mode so that all internal equipment within systems contained in the home location register can be configured to a maximum upon configuration of initial screens;

storing said configuration information in a database;

receiving state information about the internal equipment transmitted from each of the HLR systems after initializing all of said equipment such that each carries "Not Equip" state information; and visually displaying a fault state of said equipment onto a graphics figure on a screen corresponding to the relevant equipment by means of said received state information and said configuration information stored in said database corresponding to said received state information, and generating an audible warning with respect to said displayed fault state.

2. The method of managing system fault as defined in claim 1, wherein said graphics figure further comprises:

a main screen graphic expressed such that a complete view of the entire state of each system can be displayed to the operator;

a system screen graphic expressed such that a systematic view of the states of each of said systems can be displayed to the operator; and a board mounting screen graphic displayed on the screen by combining the states of boards mounted on front and back sides, and software screen graphics expressed by combining software states of processes to be performed in each of said systems.

3. The method of managing system fault as defined in claim 2, wherein said graphics are deployed on screen in top-down order of the main screen graphic, the system screen graphic, the board mounting screen graphic, and the software screen graphic.

4. The method of managing system fault as defined in claim 1, wherein said visual display varies depending on fault levels, wherein a critical fault state is expressed in red, a major fault state is expressed in orange, a minor fault state is expressed in yellow, a normal said fault state is expressed in green, and when no state information is present, said fault state is expressed in black color.

5. The method of managing system fault as defined in claim 4, wherein said audible warning for said fault states employs different alarm sounds depending on said fault levels.

6. A method of compensating for inconsistencies between the current fault states of systems constituting the CDMA home location register (HLR) and the fault graphics states displaying said fault states, comprising the steps of:

initializing an expression of said fault graphics states according to an operator request when said fault states of said systems are inconsistent with said fault graphics states;

reconfiguring the current fault state information by requesting and receiving the current fault state information transmitted from said systems; and displaying said fault graphics state on said screen in response to said reconfigured fault state information.

7. The method as defined in claim 6, wherein a reconfiguring button is provided on the displayed main screen to enable the operator to display a complete view of the entire states of all the systems.

8. A method for processing fault events occurring in systems constituting a CDMA home location register (HLR), comprising the steps of:

analyzing state information received from faulty equipment within the systems;

updating an internal fault details storing unit corresponding to the state information of the equipment;

updating the color of a higher graphics figure representative of relevant equipment presented on a main screen and being continuously displayed by combining fault levels based on said state information;

determining whether a detailed screen corresponding to said relevant equipment is currently displayed;

presenting each of the graphic figures of said relevant equipment in the updated fault level colors when said detailed screen corresponding to said relevant equipment is displayed on the current screen; and generating audible warnings depending on said fault levels based on said updated state information stored in said internal fault details storing unit.

9. The method for processing fault events as defined in claim 8, wherein said fault level color is presented in red when the fault state is critical, in orange when the fault state is major, in yellow when the fault state is minor, in green when the fault state is normal, and in black when the fault state information is missing.

10. The method for processing fault events as defined in claim 8, wherein said audible warning is selectively deactivated by the operator.

11. The method for processing fault events as defined in claim 8, wherein said audible warning is automatically turned on upon occurrence of a fault, irrespective of the operator's previous deactivation of the same.

12. The method for processing fault events as defined in claim 10, wherein an audio warning selection button to be activated by said operator is displayed on the main screen such that said operator can get a complete view of the states of all the systems.

13. The method for processing fault events as defined in claim 11, wherein an audio warning selection button to be activated by said operator is displayed on the main screen such that said operator can get a complete view of the states of all the systems.

* * * * *